(12) United States Patent
Miao et al.

(10) Patent No.: US 12,395,391 B2
(45) Date of Patent: Aug. 19, 2025

(54) CHANNEL SELECTION AND CONFIGURATION METHODS AND APPARATUSES

(71) Applicant: DATANG MOBILE COMMUNICATIONS EQUIPMENT CO., LTD., Beijing (CN)

(72) Inventors: Deshan Miao, Beijing (CN); Bin Ren, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 122 days.

(21) Appl. No.: 17/768,215

(22) PCT Filed: Sep. 29, 2020

(86) PCT No.: PCT/CN2020/119088
§ 371 (c)(1),
(2) Date: Apr. 11, 2022

(87) PCT Pub. No.: WO2021/078007
PCT Pub. Date: Apr. 29, 2021

(65) Prior Publication Data
US 2024/0098796 A1    Mar. 21, 2024

(30) Foreign Application Priority Data
Oct. 21, 2019   (CN) .......................... 201910999470.6

(51) Int. Cl.
*H04W 74/0833*   (2024.01)
*H04L 27/26*   (2006.01)

(52) U.S. Cl.
CPC ... *H04W 74/0833* (2013.01); *H04L 27/26025* (2021.01); *H04L 27/26132* (2021.01)

(58) Field of Classification Search
None
See application file for complete search history.

(56) References Cited

U.S. PATENT DOCUMENTS

| 7,680,141 B2 * | 3/2010 | Miyake | G06F 1/1626 |
| | | | 370/428 |
| 2014/0241171 A1 * | 8/2014 | Moon | H04W 24/10 |
| | | | 370/242 |

(Continued)

FOREIGN PATENT DOCUMENTS

| CN | 101262279 | * | 7/2007 |
| CN | 103797861 | * | 5/2014 |

(Continued)

OTHER PUBLICATIONS

DISH Network et al., "Satellite Aspects- Forward Compatibility Consideration for Random Access", 3GPP TSG RAN WG1 Meeting NR AH, Spokane, WA, Jan. 16-20, 2017, total 5 pages, R1-1700700.

(Continued)

*Primary Examiner* — Andre Tacdiran
(74) *Attorney, Agent, or Firm* — KILPATRICK TOWNSEND & STOCKTON LLP

(57) ABSTRACT

Disclosed in the present disclosure are channel selection and configuration methods and apparatuses. At a terminal side, the channel selection method provided in an embodiment of the present disclosure includes: determining a current signal transmission condition; and according to the current signal transmission condition and the configuration of a network, selecting the resources and channel format of a random access channel, and the random access channel uses a structure in which signal transmission is performed by using a means of repeated transmission by multiple preamble symbols.

20 Claims, 3 Drawing Sheets

(56) References Cited

U.S. PATENT DOCUMENTS

2016/0113038 A1 4/2016 Otani
2019/0191454 A1 6/2019 Blankenship et al.

FOREIGN PATENT DOCUMENTS

| | | | |
|---|---|---|---|
| CN | 106233794 | A | 12/2016 |
| CN | 108289338 | A | 7/2018 |
| CN | 109565887 | * | 4/2019 |
| CN | 109565887 | A | 4/2019 |
| WO | 2013168870 | A1 | 11/2013 |
| WO | 2017027059 | A1 | 2/2017 |
| WO | 2019161044 | A1 | 8/2019 |
| WO | 2020198671 | A1 | 10/2020 |
| WO | 2021007323 | A1 | 1/2021 |

OTHER PUBLICATIONS

ZTE Corporation et al., "Random access preamble structure and signaling", 3GPP TSG RAN WG1 Meeting #87, Reno, USA, Nov. 14-18, 2016, total 6 pages, R1-1611271.

Qualcomm Incorporated, "Reciprocity vs Non reciprocity in Initial Access/RACH", 3GPP TSG RAN WG1 Meeting #87, Reno, Nevada, USA, Nov. 14-18, 2016, total 10 pages, R1-1612037.

Qualcomm Incorporated, "RACH Procedure and UL Timing Control for NTN", 3GPP TSG RAN WG1 #98bis, Chongqing, China, Oct. 14-20, 2019, total 9 pages, R1-1911115.

Nokia et al., "Doppler Compensation, Uplink Timing Advance, Random Access and UE Location in NTN", 3GPP TSG RAN WG1 Meeting #98bis, Chongqing, China, Oct. 14-20, 2019, total 30 pages, R1-1911220.

\* cited by examiner

CHANNEL SELECTION AND CONFIGURATION METHODS AND APPARATUSES

CROSS-REFERENCE TO RELATED APPLICATIONS

The present application is a US National Stage of International Application No. PCT/CN2020/119088, filed on Sep. 29, 2020, which claims the priority of the Chinese patent application No. 201910999470.6 filed to the China Patent Office on Oct. 21, 2019, and entitled "Channel Selection and Configuration Methods and Apparatuses", of which the entire contents are incorporated herein by reference.

FIELD

The present disclosure relates to the field of communication, in particular to channel selection and configuration methods and apparatuses.

BACKGROUND

In an existing terrestrial 5G mobile communication system, its single-carrier bandwidth at a high frequency band is defined as an integer multiple of 50 MHz, a minimum value is 50 MHz, and typical values are 100 MHz, 200 MHz, 400 MHz and other types. Taking a subcarrier spacing of 120 KHz as an example, specific parameters of each bandwidth are shown in Table 1 below. Based on this bandwidth definition, setting of a random access channel is not affected.

TABLE 1

Single-carrier bandwidth definition of a 5G system

| | Defined bandwidth | | | |
| --- | --- | --- | --- | --- |
| | 50 MHz | 100 MHz | 200 MHz | 400 MHZ |
| physical resource block (PRB) number | 32 | 66 | 132 | 264 |
| Effective bandwidth | 46.08 MHz | 95.04 MHZ | 190.08 MHz | 380.16 MHz |

For a satellite mobile communication system that adopts a terrestrial 5G system, limited by sending power of a terminal, an uplink sending bandwidth of a low-power terminal can hardly reach a minimum bandwidth defined by the terrestrial 5G system, and the random access channel may be changed from an original unrestricted bandwidth to a restricted bandwidth. At this moment, how to design the uplink sending bandwidth of the terminal and how to design relevant parameters of the random access channel need to be reasonably considered.

SUMMARY

Embodiments of the present disclosure provide channel selection and configuration methods and apparatuses, which are used to resist propagation delay offset of different users within a cell and improve a signal-to-noise ratio of random access channel sending signals, to provide a random access channel selection solution suitable for a satellite communication system.

At a terminal side, a channel selection method provided by an embodiment of the present disclosure, includes: determining a current signal transmission condition; and selecting a resource and a channel format of a random access channel according to the current signal transmission condition and configuration of a network, where the random access channel adopts a structure in which signal transmission is performed by repeatedly sending preamble symbols.

The method selects the resource and channel format of the random access channel according to the current signal transmission condition and the configuration of the network, where the random access channel adopts the structure in which signal transmission is performed by repeatedly sending preamble symbols, that is, the mode of repeatedly sending preamble symbols is adopted to resist propagation delay offset of different users in a cell, and repeatedly sending preamble symbols may further improve a signal-to-noise ratio of sending signals. Thus, the method provides a random access channel selection solution suitable for a satellite communication system.

In one embodiment, the current signal transmission condition includes one or a combination of the following conditions: a type of a terminal; a capability of the terminal; a level of the terminal;
a movement speed of the terminal; or error of ephemeris information of the terminal.

In one embodiment, in a case of selecting the random access channel according to the type of the terminal or the capability of the terminal or the level of the terminal, the selecting the random access channel according to the current signal transmission condition specifically includes: determining a sending bandwidth capability of the terminal according to the type of the terminal or the capability of the terminal or the level of the terminal, and determining a subcarrier spacing and a preamble sequence length according to the sending bandwidth capability of the terminal; and selecting the random access channel format according to the subcarrier spacing and the preamble sequence length; or, determining an uplink budget of the terminal according to the type of the terminal or the capability of the terminal or the level of the terminal, and determining the repetition number of the preamble symbols according to the uplink budget of the terminal; and selecting the random access channel format according to the repetition number of the preamble symbols.

In one embodiment, in a case of selecting the random access channel according to the movement speed of the terminal, the selecting the random access channel according to the current signal transmission condition specifically includes: determining a Doppler shift range of the terminal according to the movement speed of the terminal, and determining a subcarrier spacing and a preamble sequence set according to the Doppler shift range of the terminal; and selecting the random access channel format according to the subcarrier spacing and the preamble sequence set.

In one embodiment, in a case of selecting the random access channel according to the error of the ephemeris information of the terminal, the selecting the random access channel according to the current signal transmission condition specifically includes: determining a range of uplink timing error and Doppler shift after pre-compensation according to an error range of the ephemeris information obtained by the terminal, and determining a subcarrier spacing and a guard interval length according to the range of the uplink timing error and the Doppler shift after pre-compensation; and selecting the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or a signal-to-noise ratio from the network to a terminal; and the selecting the random access channel according to the current signal transmission condition specifically includes: in a case that the terminal initially accesses, determining the repetition number of the preamble symbols based on the downlink received signal power or signal-to-noise ratio from the network to the terminal, and determining and selecting the random access channel format according to the repetition number of the preamble symbols.

In one embodiment, the format of the random access channel is selected from the random access channel formats shown in the following table:

| Physical random access channel (PRACH) format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | Pseudo-superimposed (Zadoff Chu, ZC) sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | |

In one embodiment, the resource of the random access channel corresponds to one or more different random access channel formats.

In one embodiment, the method further includes: adopting the selected random access channel for signal transmission.

Correspondingly, at a network side, a channel configuration method provided by an embodiment of the present disclosure includes: determining a signal transmission condition of a terminal; and configuring a resource and a channel format of a random access channel according to the signal transmission condition, and notifying the terminal of the resource and channel format of the random access channel, where the random access channel adopts a structure in which signal transmission is performed by repeatedly sending a plurality of preamble symbols.

In one embodiment, the signal transmission condition includes one or a combination of the following conditions: a type of a terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |

-continued

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 3 | 139 | 60 khz | [15 − 6 = 9] * 16.67 µs = 150.03 µs | 6 * 16.67 µs = 100 µs | Unrestricted sequence |
| 4 | 139 | 60 khz | [15 − 3 = 12] * 16.67 µs = 200.04 µs | 3 * 16.67 µs = 50 µs | |
| 5 | 139 | 120 khz | [30 − 12 = 18] * 8.33 µs = 150.03 µs | 12 * 8.33 µs = 100 µs | | where PRACH is the random access channel.

In one embodiment, the resource of the random access channel corresponds to one or more different random access channel formats.

In one embodiment, the method further includes: selling different sliding detection windows based on resources and channel formats of different random access channels, and detecting a random access signal sent by the terminal.

At a terminal side, a channel selection apparatus provided by an embodiment of the present disclosure, includes: a determining device, configured to determine a current signal transmission condition; and a selecting device, configured to select a resource and a channel format of a random access channel according to the current signal transmission condition and configuration of a network, where the random access channel adopts a structure in which signal transmission is performed by repeatedly sending preamble symbols.

In one embodiment, the current signal transmission condition includes one or a combination of the following conditions: a type of a terminal; a capability of the terminal; a level of the terminal; a movement speed of the terminal; or error of ephemeris information of the terminal.

In one embodiment, the selecting device is specifically configured to: determine a sending bandwidth capability of the terminal according to the type of the terminal or the capability of the terminal or the level of the terminal, and determine a subcarrier spacing and a preamble sequence length according to the sending bandwidth capability of the terminal; and select the random access channel format according to the subcarrier spacing and the preamble sequence length; or, determine an uplink budget of the terminal according to the type of the terminal or the capability of the terminal or the level of the terminal, and determine the repetition number of the preamble symbols according to the uplink budget of the terminal; and select the random access channel format according to the repetition number of the preamble symbols.

In one embodiment, the selecting device is specifically configured to: determine a Doppler shift range of the terminal according to the movement speed of the terminal, and determine a subcarrier spacing and a preamble sequence set according to the Doppler shift range of the terminal; and select the random access channel format according to the subcarrier spacing and the preamble sequence set.

In one embodiment, the selecting device is specifically configured to: determine a range of uplink timing error and Doppler shift after pre-compensation according to an error range of the ephemeris information obtained by the terminal, and determine a subcarrier spacing and a guard interval length according to the range of the uplink timing error and the Doppler shift after pre-compensation; and select the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or a signal-to-noise ratio from the network to a terminal; and the selecting device is specifically configured to: in a case that the terminal initially accesses, determine the repetition number of the preamble symbols based on the downlink received signal power or signal-to-noise ratio from the network to the terminal, and determine and select the random access channel format according to the repetition number of the preamble symbols.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 µs = 266.68 µs | 1 * 66.67 µs = 66.67 µs | Unrestricted sequence, |
| 1 | 839 | 15 khz | [15 − 2 = 13] * 66.67 µs = 866.71 µs | 2 * 66.67 µs = 133.34 µs | Type A sequence |
| 2 | 839 | 30 khz | [5 − 1 = 4] * 33.33 µs = 133.32 µs | 1 * 33.33 µs = 33.33 µs | |
| 3 | 139 | 60 khz | [15 − 6 = 9] * 16.67 µs = 150.03 µs | 6 * 16.67 µs = 100 µs | Unrestricted sequence |
| 4 | 139 | 60 khz | [15 − 3 = 12] * 16.67 µs = 200.04 µs | 3 * 16.67 µs = 50 µs | |
| 5 | 139 | 120 khz | [30 − 12 = 18] * 8.33 µs = 150.03 µs | 12 * 8.33 µs = 100 µs | | where PRACH is the random access channel.

In one embodiment, the resource of the random access channel corresponds to one or more different random access channel formats.

In one embodiment, the selecting device is further configured to: adopt the selected random access channel for signal transmission.

At a network side, a channel configuration apparatus provided by an embodiment of the present disclosure includes: a determining device, configured to determine a signal transmission condition of a terminal; and a notifying device, configured to configure a resource and a channel format of a random access channel according to the signal transmission condition, and notify the terminal of the resource and channel format of the random access channel, where the random access channel adopts a structure in which signal transmission is performed by repeatedly sending preamble symbols.

In one embodiment, the signal transmission condition includes one or a combination of the following conditions: a type of a terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

tion and configuration of a network, where the random access channel adopts a structure in which signal transmission is performed by repeatedly sending preamble symbols.

In one embodiment, the current signal transmission condition includes one or a combination of the following conditions: a type of a terminal; a capability of the terminal; a level of the terminal; a movement speed of the terminal; or error of ephemeris information of the terminal.

In one embodiment, the processor is specifically configured to: determine a sending bandwidth capability of the terminal according to the type of the terminal or the capability of the terminal or the level of the terminal, and determine a subcarrier spacing and a preamble sequence length according to the sending bandwidth capability of the terminal; and select the random access channel format according to the subcarrier spacing and the preamble sequence length; or, determine an uplink budget of the terminal according to the type of the terminal or the capability of the terminal or the level of the terminal, and determine the repetition number of the preamble symbols according to the uplink budget of the terminal; and select the random access channel format according to the repetition number of the preamble symbols.

In one embodiment, the processor is specifically configured to: determine a Doppler shift range of the terminal according to the movement speed of the terminal, and determine a subcarrier spacing and a preamble sequence set according to the Doppler shift range of the terminal; and select the random access channel format according to the subcarrier spacing and the preamble sequence set.

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the notifying device is further configured to: set different sliding detection windows based on resources and channel formats of the different random access channels, and detecting a random access signal sent by the terminal.

At a terminal side, another channel selection apparatus provided by an embodiment of the present disclosure, includes: a memory and a processor; where the memory is configured to store a program instruction, and the processor is configured to call the program instruction stored in the memory and execute according to the obtained program: determining a current signal transmission condition; selecting a resource and a channel format of a random access channel according to the current signal transmission condi- In one embodiment, the processor is specifically configured to: determine a range of uplink timing error and Doppler shift after pre-compensation according to an error range of the ephemeris information obtained by the terminal, and determine a subcarrier spacing and a guard interval length according to the range of the uplink timing error and the Doppler shift after pre-compensation; and select the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or a signal-to-noise ratio from the network to a terminal; and the processor is specifically configured to: in a case that the terminal initially accesses, determine the repetition number of the preamble symbols based on the downlink received signal power or signal-to-noise ratio from the network to the terminal, and determine and select the random access channel format according to the repetition number of the preamble symbols.

In one embodiment, the format of the random access channel is selected from the random access channel formals shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the processor is further configured to: adopt the selected random access channel for signal transmission.

Another channel configuration apparatus provided by an embodiment of the present disclosure, includes: a memory and a processor; where the memory is configured to store a program instruction, and the processor is configured to call the program instruction stored in the memory and execute according to the obtained program: determining a signal transmission condition of a terminal; configuring a resource and a channel format of a random access channel according to the signal transmission condition, and notifying the terminal of the resource and channel format of the random access channel, where the random access channel adopts a structure in which signal transmission is performed by repeatedly sending preamble symbols.

In one embodiment, the signal transmission condition includes one or a combination of the following conditions:

a type of a terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the processor is further configured to: set different sliding detection windows based on resources and channel formats of the different random access channels, and detect a random access signal sent by the terminal.

Another embodiment of the present disclosure provides a computer storage medium. The computer storage medium stores a computer executable instruction, and the computer executable instruction is configured to enable a computer to execute any above channel selection method.

Another embodiment of the present disclosure provides a computer storage medium. The computer storage medium stores a computer executable instruction, and the computer executable instruction is configured to enable a computer to execute any above channel configuration method.

BRIEF DESCRIPTION OF THE DRAWINGS

In order to illustrate the embodiments of the present disclosure more clearly, drawings needing to be used in description of the embodiments will be introduced below briefly. The drawings in the following description are only some embodiments of the present disclosure, and other drawings can be further obtained according to these drawings without inventive efforts.

DETAILED DESCRIPTION OF THE EMBODIMENTS

Figure 1:
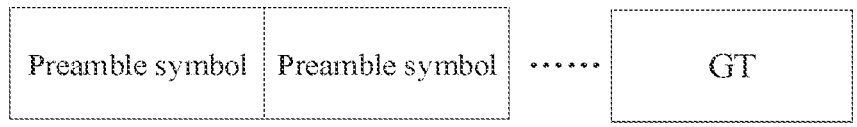
FIG. 1 is a schematic diagram of a PRACH format in a satellite communication system provided by an embodiment of the present disclosure.

The embodiments of the present disclosure will be described below clearly and completely with reference to the drawings in the embodiments of the present disclosure. The described embodiments are only part of the embodiments of the present disclosure, but not all the embodiments.

Embodiments of the present disclosure provide channel selection and configuration methods and apparatuses, which are used to resist transmission delay offset of different users within a cell and improve a signal-to-noise ratio of random access channel sending signals, to provide a random access channel selection solution suitable for a satellite communication system.

The methods and the apparatus are conceived based on the same disclosure. Since principles of the methods and the apparatus for solving the problem are similar, the implementation of the apparatus and the methods may refer to each other, and the repetitions are omitted.

The embodiments of the present disclosure may be applicable to various systems, especially a 5G system. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, a 5G system, a 5G new radio (NR) system, etc. These various systems include a terminal device and a network device.

The terminal device involved in the embodiments of the present disclosure may be a device that provides voice and/or data connectivity to a user, a handheld device with a wireless connection function, or other processing devices connected to a wireless modem. In different systems, names of the terminal devices may also be different. For example, in the 5G system, the terminal device may be called user equipment (UE). A wireless terminal device may communicate with one or more core networks via a radio access network (RAN), and the wireless terminal device may be a mobile terminal device, such as a mobile phone (or called a "cellular" phone) and a computer with the mobile terminal device, for example, may be portable, pocket-sized, handheld, computer-built or vehicle-mounted mobile apparatus, which exchange language and/or data with the radio access network. For example, a personal communication service (PCS) phone, a cordless phone, a session initiated protocol (SIP) phone, a wireless local loop (WLL) station, a personal digital assistant (PDA) and other devices. The wireless terminal device may also be referred to as a system, a subscriber device, a subscriber station, a mobile station, a mobile, a remote station, an access point, a remote terminal device, an access terminal device, a user terminal device, a user agent, and a user device, which is not limited in the embodiments of the present disclosure.

The network device involved in the embodiments of the present disclosure may be a base station, and the base station may include cells. According to different specific application scenarios, the base station may also be called an access point, or may refer to a device in the access network that communicates with the wireless terminal device through one or more sectors on an air interface, or other names. The network device may be configured to convert received air frames to and from internet protocol (IP) packets, and act as a router between the wireless terminal device and the rest of the access network, where the rest of the access network may include an IP communication network. The network device may further coordinate attribute management for the air interface. For example, the network device involved in the embodiments of the present disclosure may be a network device (base transceiver station, BTS) in a global system for mobile communication or code division multiple access, or a network device (NodeB) in bandwidth code division multiple access, and may further be an evolved network device (evolutional Node B, eNB or e-NodeB) in an LTE system, a 5G base station in a 5G network architecture (next generation system), or a home evolved node B (HeNB), a relay node, a home base station (Femto e-NodeB), a femto base station (Pico Cell), etc., which is not limited in the embodiments of the present disclosure.

All embodiments of the present disclosure are described in detail below with reference to the drawings of the description. It should be noted that a display order of the embodiments of the present disclosure only represents a sequential order of the embodiments, instead of superiority and inferiority of the embodiments.

In the design of a 5G random access channel, a cell radius and Doppler shift that can be tolerable cannot meet the requirements of satellite communication at the same time. In a satellite communication system, the cell radius is generally several hundred kilometers, and a Doppler shift residual reaches the order of tens of Khz at a Ka-band (a frequency range of the Ka-band is 26.5-40 GHz, and Ka represents K-above), which far exceeds the requirements of terrestrial communication. The random channel format design of the 5G system is listed in the following Table 2 and Table 3, and there are different parameter designs for low frequency FR1 (frequency range 1) and high frequency FR2 (frequency range 2). In Table 2, the maximum frequency offset that can be resisted is 10 khz, and the cell radius is only 120 km; and in Table 3, the maximum frequency offset that can be resisted is 60 khz, and the maximum cell radius is 1.2 km. This is far from the requirements of satellite communication. It is necessary to redesign a physical random access channel (PRACH) according to the requirements of satellite communication. The following three aspects may be mainly considered: 1. influence of Doppler shift; 2. influence of the cell radius and ephemeris information error; and 3. influence of a link signal-to-noise ratio.

Table 2 indicates design of 5G PRACH format of FR1 ($L_{RA}$=839 and $\Delta f^{RA} \in \{1.25,5\}$ kHz)

TABLE 2

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

Where, $L_{RA}$ represents a preamble sequence length, $\Delta f^{RA}$ represents a subcarrier interval of a preamble, $N_u$ represents a length of the preamble, which may be the repetition of symbols, and $N_{CP}^{RA}$ represents a length of CP.

Table 3 indicates design of 5G PRACH format of FR2 ($L_{RA}$=139 and $\Delta f^{RA}=15 \cdot 2^{\mu}$ kHz kHz where $\mu \in \{0,1,2,3\}$

TABLE 3

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^{\mu}$ kHz | $2 \cdot 2048 \kappa \cdot 2^{-\mu}$ | $288 \kappa \cdot 2^{-\mu}$ | — |
| A2 | 139 | $15 \cdot 2^{\mu}$ kHz | $4 \cdot 2048 \kappa \cdot 2^{-\mu}$ | $576 \kappa \cdot 2^{-\mu}$ | — |
| A3 | 139 | $15 \cdot 2^{\mu}$ kHz | $6 \cdot 2048 \kappa \cdot 2^{-\mu}$ | $846 \kappa \cdot 2^{-\mu}$ | — |
| B1 | 139 | $15 \cdot 2^{\mu}$ kHz | $2 \cdot 2048 \kappa \cdot 2^{-\mu}$ | $216 \kappa \cdot 2^{-\mu}$ | — |
| B2 | 139 | $15 \cdot 2^{\mu}$ kHz | $4 \cdot 2048 \kappa \cdot 2^{-\mu}$ | $360 \kappa \cdot 2^{-\mu}$ | — |
| B3 | 139 | $15 \cdot 2^{\mu}$ kHz | $6 \cdot 2048 \kappa \cdot 2^{-\mu}$ | $504 \kappa \cdot 2^{-\mu}$ | — |
| B4 | 139 | $15 \cdot 2^{\mu}$ kHz | $12 \cdot 2048 \kappa \cdot 2^{-\mu}$ | $936 \kappa \cdot 2^{-\mu}$ | — |
| C0 | 139 | $15 \cdot 2^{\mu}$ kHz | $2048 \kappa \cdot 2^{-\mu}$ | $1240 \kappa \cdot 2^{-\mu}$ | — |
| C2 | 139 | $15 \cdot 2^{\mu}$ kHz | $4 \cdot 2048 \kappa \cdot 2^{-\mu}$ | $2048 \kappa \cdot 2^{-\mu}$ | — |

To sum up, because satellite communication needs to resist the influence of large delay, high frequency offset, and low signal-to-noise ratio, which is precisely the shortcoming of the existing 5G system, 5G has small coverage at a high frequency band which can only meet the requirements of high frequency offset and small delay, and can only meet the requirements of large coverage and low frequency offset at the low frequency, so it is necessary to re-design the PRACH for the application scenario of satellite communication.

In the embodiments of the present disclosure, for the satellite communication system designed based on the terrestrial 5G system, a reasonable random access channel format and parameters are designed according to the cell radius, a sending bandwidth of the terminal, error of ephemeris information, and a range of the Doppler shift. Furthermore, based on the designed parameter tables of the random access channel, a method for the terminal to select a random access channel is provided.

An embodiment of the present disclosure provides a method for designing the random access channel format and parameter in a satellite mobile communication system, which is specifically as follows.

(1) For large delay, resisting is performed by repeatedly sending preamble symbols, that is, a PRACH structure of cyclic prefix (CP)+Preamble+guard interval (GT) in the prior art is changed into the structure of Preamble+Preamble+ . . . +GT.

The plurality described in the embodiments of the present disclosure may be two or more.

(2) For a low signal-to-noise ratio, preamble symbols are repeatedly sent, and a base station performs receiving detection and diversity processing to resist the low signal-to-noise ratio. Specifically, the base station performs correlation detection on each preamble symbol, and accumulates correlation values of symbols; and when the accumulated correlation value exceeds a preset threshold, it indicates that the preamble symbols sent by a terminal is detected, so as to avoid performance degradation due to a single symbol encountering channel fading.

(3) Different subcarrier spacings and preamble sequences of different lengths are provided for different terminal sending bandwidths, and the terminal may select a PRACH format based on the capability and level of the terminal during initial access.

(4) Different PRACH formats are provided based on ephemeris information error. Because the terminal calculates a pre-compensation value of the timing advance amount and Doppler shift based on location information of the terminal and ephemeris information, and the ephemeris information provides satellite orbiting information, when there is the error in the ephemeris information, the terminal suffers greater Doppler shift and timing error when sending a PRACH signal. Therefore, it is necessary to design a more robust PRACH structure and parameters to ensure performance of random access. The ephemeris information is related information about a satellite orbiting trajectory. The specific location of a satellite in the sky may be derived and calculated from the ephemeris information.

Based on the above design principle, the PRACH format for satellite communication is designed in detail below.

(1) An Application Scenario and Demand Analysis of Satellite Communication. The Following Factors are Mainly Considered.

1) the Form of the Terminal (or Called a Terminal Type).

The form of the terminal is related to the sending bandwidth and power of the terminal. For example, the form of the terminal refers to a handheld terminal, a fixed terminal, a vehicle-mounted or airborne terminal, etc., and is related to the bandwidth and power of the terminal.

Generally, power of the handheld terminal and the vehicle-mounted terminal is relatively limited, resulting in a small sending bandwidth; and at the same time, an uplink budget is also poor, and an uplink signal-to-noise ratio is low, which requires the sending bandwidth of the PRACH to be set smaller, and the repetition number of the preamble symbol is more.

For the fixed terminal, the sending power is large, and the corresponding sending bandwidth capability is also large, and the sending bandwidth of the PRACH may be configured to be larger.

2) A Capability and Level of the Terminal.

The capability or level of the terminal usually defines the sending power and sending bandwidth of the terminal. The sending power of the terminal with a high level is higher, and the uplink signal-to-noise ratio will be higher, while the sending power of the terminal with a low level is smaller and the sending bandwidth is also smaller, which limits the configuration of the sending bandwidth of the PRACH and the repetition number of the preamble symbols.

The terminal capability also include whether the terminal has a capability to obtain geographic location information, that is, whether the terminal can be positioned either through a satellite navigation signal or through a network-assisted positioning mechanism. When the terminal can obtain its own location information, it is possible for the terminal to perform pre-compensation of the frequency and timing, otherwise the PRACH of the terminal needs to resist particularly large timing offset and frequency offset.

3) An Application Scenario and Movement Speed of the Terminal.

The application scenario of the terminal is related to the Doppler shift. For example, the application scenario refers to an application scope of the terminal, mainly including a mobile scenario, a fixed scenario, a large-capacity data service scenario, and a voice service scenario, which are related to requirements. When the movement speed of the terminal is high, it will cause a large Doppler shift; and therefore, a larger subcarrier spacing needs to be selected. For example, a satellite terminal on an aircraft needs to be configured with the large subcarrier spacing.

The application scenario of the terminal also includes a radius of a cell and a frequency band deployed in the cell. The larger the radius of the cell is, the greater the delay offset resisted by the terminal is. The higher the frequency deployed in the cell is, the greater the Doppler shift and frequency offset are, which puts forward new requirements for PRACH design.

4) Error of the Ephemeris Information.

The error of the ephemeris information is related to the timing advance (TA) amount and Doppler residual. Due to the error of the ephemeris information, there is an error in the pre-compensation of the uplink timing and Doppler shift of the terminal, and thus the residual time domain shift and frequency domain shift need to be considered during the PRACH format design. If the ephemeris information error is large, it is necessary to design a channel format of the PRACH that can resist the large time delay offset and the Doppler offset.

Based on the above multiple factors, the embodiments of the present disclosure design a table of application scenario and signal transmission requirements (or called signal transmission conditions) as shown in Table 4 below.

Table 4 indicates design requirements of the PRACH format for satellite communication.

TABLE 4

| Terminal type | Airborne | Shipborne | Vehicle-mounted (high speed rail) | Vehicle-mounted (automobile) Ephemeris information needs to consider worst case | Portable terminal Ephemeris information needs to consider the worst case | Fixed access terminal | Vehicle-mounted (automobile) or portable terminal [In the case of switching at a connection state] |
|---|---|---|---|---|---|---|---|
| Maximum frequency offset needing to be resisted | >30 KHz | <20 KHz | <20 KHz | Case 1: <20 KHz, when TA = 20 μs Case 2: <30 KHz, when TA = 100 μs | Case 1: <10 khz, when TA = 20 μs Case 2: <20 khz, when TA = 100 μs | <10 khz | <5 khz |
| Maximum available random access bandwidth | <30 Mhz | <30 Mhz | <30 Mhz | <15 Mhz | <15 Mhz | <30 Mhz | <15 Mhz |
| TA support range | <20 μs | <20 μs | <20 μs | . . . | . . . | <20 μs | <10 μs |

(2) The PRACH Format for Satellite Communication.

For the design requirements of satellite communication, the embodiments of the present disclosure design the PRACH formats shown in Table 5 below.

Table 5 indicates PRACH format of satellite communication.

TABLE 5

| PRACH format serial number Format | Preamble sequence length | Subcarrier spacing | Preamble symbol length = repetition number * 1 OFDM symbol time length [Consider that all symbols in a slot except for the GT at the end are used for preamble sequence transmission] | GT length = repetition number * 1 OFDM symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted, Type A |
| 1 | 839 | 15 khz | [15 − 2 = 13] * 66.67 μs = 866.71 μs | 2 * 66.67 μs = 133.34 μs | |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | |

Where, for a sequence with a length of 139, there are only unrestricted sequences.

Specific examples are given below.

1, A PRACH design structure provided by an embodiment of the present disclosure is shown in FIG. 1.

That is, in the embodiment of the present disclosure, for large time delay, resisting is performed by repeatedly sending preamble symbols, that is, a PRACH structure of CP+Preamble+GT in the prior art is changed into the structure of Preamble+Preamble+ . . . +GT.

2, For a preamble sequence with a length of 839, the subcarrier spacing of 15 khz or 30 khz is adopted, which is used for the case where the frequency offset is small. The frequency offset depends on the selection of the sequence. When adopting an unrestricted sequence, a tolerance range of the frequency offset is half that of the subcarrier spacing. When adopting a Type A sequence, the frequency offset range same as the subcarrier spacing may be tolerated. The different number of preamble symbols can resist different signal-to-noise ratios, and meanwhile different time delays may be estimated. The different configurations of the GT are used to isolate interference of the PRACH signal and other uplink signals, and are also used to configure a detection window of PRACH at a base station side at the same time. The maximum uplink timing offset that can be detected is half the length of the GT.

3, For a preamble sequence with a length of 139, the subcarrier spacing of 60 kz or 120 khz is adopted, which is mainly used for scenarios with a large frequency offset, such as an airplane and a high-speed railway, and is also used for a scenario with inaccurate ephemeris information. When the ephemeris information is inaccurate, the terminal cannot accurately predict an orbital location of the satellite, and the terminal cannot perform accurate Doppler pre-compensation, resulting in a large Doppler residual frequency offset. At this time, the preamble signal needs to adopt the larger subcarrier spacing.

For example, for the configuration shown in Table 6 (namely, the PRACH format 0 in Table 5), there are two sequence sets: an unrestricted sequence set and a Type A sequence set, which can resist the different Doppler shifts.

The unrestricted sequence set refers to preamble sequences generated based on a root sequence, and the cyclic shift of each sequence is different. In the unrestricted sequence set, an interval of the cyclic shift between the sequences is set according to the size of the cell radius, and is not constrained by the channel frequency offset.

The Type A sequence set refers to preamble sequences generated based on a root sequence. The interval of the cyclic shift of each sequence is set not only according to the size of the cell radius, but also according to constraint of the channel frequency offset. The frequency offset tolerance capability of the Type A is ½ subcarrier spacing, so the interval of the cyclic shift is constrained, and the frequency offset resistance capability is improved by increasing the interval of the cyclic shift.

TABLE 6

| 0 | 839 | 15 khz | [5 − 1 = 4] * 66.67 μs = 266.68 μs | 1 * 66.67 μs = 66.67 μs | Unrestricted, Type A |

It can be seen that the bandwidth is 839*15 khz=12.585 Mhz. At this moment, the PRACH format 0 is suitable for all the terminal types shown in Table 4.

When adopting the unrestricted sequence, the subcarrier spacing of 15 khz can resist the frequency offset of 7.5 khz, and can be used in the case of the vehicle-mounted (automobile) or portable terminal in the connected state in Table 4. Because the terminal has access to the cell, the uplink frequency offset and timing offset are small.

The length of the GT is 66.67 s, which can be used in all other scenarios except that the ephemeris information error is particularly serious in Table 4, and is configured to resist the uplink timing error of 33 μs.

The repetition number of the preamble sequence length is 4, which can resist the low signal-to-noise ratios, such as −10 dB or below.

The subcarrier spacing and a single symbol of preamble are the inverse relationship, and the subcarrier spacing of 15 khz corresponds to 66.67 μs. The symbol lengths involved in all the tables are expressed with one OFDM symbol as the basic device.

For explanation of each parameter and requirement, specific examples are as follows.

The sending bandwidth and sending power of the terminal are related, so there will be a difference in requirements of the sending bandwidth of PRACH. For the handheld and vehicle-mounted terminals, the cost of the satellite is limited, so the power sending capability is limited, resulting in the limited sending bandwidth. Because the uplink signal-to-noise ratio with the too large bandwidth is low, it cannot meet the requirement of the signal-to-noise ratio. The different terminal levels correspond to the different sending power and the different sending bandwidths.

The subcarrier spacing has a great relationship with the frequency offset error. The frequency offset error includes clock crystal oscillator error and the Doppler shift, and the embodiments of the present disclosure mainly analyze the influence of the Doppler shift. The greater the movement speed is, the greater the Doppler shift is. Therefore, different movement speeds such as an aircraft terminal, the vehicle-mounted terminal, and the handheld terminal will cause the different Doppler shifts. Therefore, the different PRACH subcarrier spacings need to be selected.

The ephemeris information corresponds to the orbital location of the satellite. The terminal may calculate a connection distance between the terminal and the satellite based on the location of the satellite. At the same time, the terminal may calculate the Doppler shift caused by the movement of the satellite based on the location of the satellite and the movement speed of the satellite. When the ephemeris information is accurate, the terminal may accurately calculate the uplink timing advance amount and a Doppler shift value, and then send the PRACH signal to perform corresponding pre-compensation, it's called residual timing offset and residual frequency offset after compensation. However, when the ephemeris information is inaccurate, the terminal cannot obtain the uplink timing advance amount and the Doppler shift value brought by the satellite. At this moment, sending of the PRACH signal will suffer from the large uplink timing offset and Doppler residual, so it is necessary to select the large subcarrier spacing and a large TA tolerant capability.

The requirement of the signal-to-noise ratio is related to the level of the terminal and the application scenario. For the handheld and vehicle-mounted terminals, the uplink sending power is limited, and there are requirements for the repetition number of the Preamble. If it is on a boundary of a satellite beam, it is also necessary to rely on improving the repetition number to get performance guarantee.

For the terminal, when selecting a PRACH resource, if a downlink signal-to-noise ratio is found to be low, the PRACH configuration with more preamble symbols may be selected. Because the more preamble symbols are, the stronger the capability to resist the low signal-to-noise ratio is, and the terminal may select the corresponding PRACH format according to the measured downlink signal power or signal-to-noise ratio.

In system configuration, the different PRACH configurations correspond to the different PRACH resources. When the different terminal types and levels require the different PRACH configurations, the terminal may select the different PRACH resources according to the terminal types and requirements.

In Table 7 below, an example of a recommended value of the PRACH format in different scenarios is given, that is, Table 7 correlates with Table 4 and Table 5, and exemplifies how the terminal selects the corresponding PRACH format according to a current signal transmission condition (requirement), and the PRACH of this format is adopted for signal transmission.

TABLE 7

| Terminal type | Airborne | Shipborne | Vehicle-mounted (high speed rail) | Vehicle-mounted (automobile) Ephemeris information needs to consider worst case | Portable terminal Ephemeris information needs to consider the worst case | Fixed access terminal | Vehicle-mounted (automobile) or portable terminal [In the case of switching at a connection state] |
|---|---|---|---|---|---|---|---|
| Maximum frequency offset needing to be resisted | >30 KHz | <20 KHz | <20 KHz | Case 1: <20 KHz, when TA = 20 μs Case 2: <30 KHz, when TA = 100 μs | Case 1: <10 khz, when TA = 20 μs Case 2: <20 khz, when TA = 100 μs | <10 khz | <5 khz |
| Maximum available random access bandwidth | <30 Mhz | <30 Mhz | <30 Mhz | <15 Mhz | <15 Mhz | <30 Mhz | <15 Mhz |
| TA support range | <20 μs | <20 μs | <20 μs | . . . | . . . | <20 μs | <10 μs |
| PRACH selection | Format 3/4/5 | Format 2 | Format2 | Case1: format2 Case2: format3 | Case1: format0/1 Case2: format3 | Format 0 | Format0 |

To sum up, the embodiments of the present disclosure provides the design method of the random access channel format and parameter in the satellite mobile communication system, specifically including the following.

The propagation time delay offset of different users in the cell is resisted by repeatedly sending preamble symbols, and the structure of CP+Preambl+GT is changed into the structure of Preamble+Preamble+ . . . +GT. Furthermore, preamble symbols are repeatedly sent, which can improve the signal-to-noise ratio of the sending signal.

The different subcarrier spacings and the preamble sequences with the different lengths are provided for different sending bandwidth capabilities of the terminal, and the terminal may select the PRACH format based on the capability and level of the terminal during initial access.

Based on the ephemeris information error, the different PRACH formats are provided to meet the requirements of frequency offset and timing error brought by different ephemeris information precisions.

Furthermore, an embodiment of the present disclosure further provides a method for selecting random access channel parameters for a satellite terminal, specifically including the following: the terminal selects different PRACH formats based on a sending bandwidth or a movement speed; and the terminal selects the different PRACH formats based on different offsets of ephemeris information.

Therefore, the embodiments of the present disclosure are optimized on the basis of the design format of the random access channel of terrestrial 5G. For the characteristics of the large uplink access delay, the large Doppler offset, the low signal-to-noise ratio and the like of satellite communication, a new PRACH format is provided in a targeted mode, and supports the different terminals to select random access formats according to application scenarios, effectively solving the difficulty in the design of uplink random access formats of the satellite communication.

Figure 2:
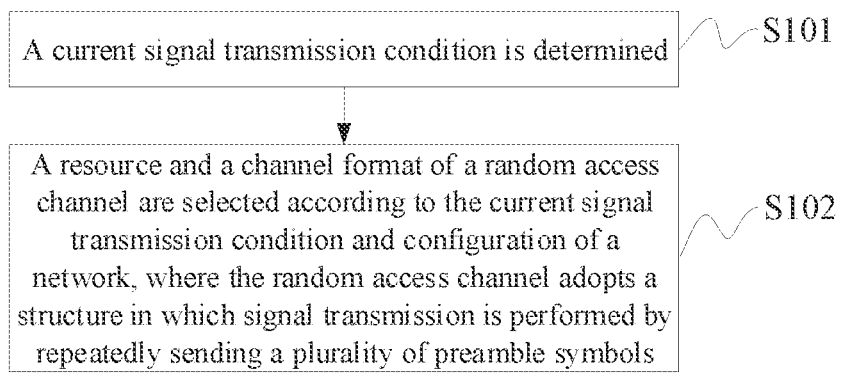
FIG. 2 is a schematic flow diagram of a channel selection method provided by an embodiment of the present disclosure.

To sum up, at a terminal side, referring to FIG. 2, a channel selection method provided by an embodiment of the present disclosure, includes the following.

S101, a current signal transmission condition is determined.

For example, the current signal transmission condition may be a condition or requirement including any one or more parameters listed in the above Table 4; or any other conditions related to signal transmission and characterized by other types of parameters; or one kind of condition parameter; or contain various condition parameters.

S102, a resource and a channel format of a random access channel are selected according to the current signal transmission condition and configuration of a network, where the random access channel adopts a structure in which signal transmission is performed by repeatedly sending preamble symbols. The configuration of the network refers to the resource and channel format of the random access channel configured by a network side for a terminal.

The method selects the random access channel according to the current signal transmission condition, where the random access channel adopts the structure in which signal transmission is performed by repeatedly sending preamble symbols, that is, the mode of repeatedly sending preamble symbols is adopted to resist propagation delay offset of different users in a cell, and repeatedly sending preamble symbols may further improve a signal-to-noise ratio of sending signals. Thus, the method provides a random access channel selection solution suitable for a satellite communication system.

In one embodiment, the current signal transmission condition includes one or a combination of the following conditions: a type of a terminal; a capability of the terminal; a level of the terminal; a movement speed of the terminal; or error of ephemeris information of the terminal.

The above condition is only a division manner with a large scope provided by the embodiments of the present disclosure. Of course, the signal transmission condition may also be divided into different categories from different dimensions or aspects. For example, it may be divided directly from the perspective of parameters (such as parameters: the sending bandwidth of the terminal, etc.), that is, the current signal transmission condition may be one or more parameter value.

In addition, the above different conditions may have repeated characterization parameters. For example, the same parameter can be used to characterize both the type of the terminal and the capability of the terminal. Therefore, in the embodiments of the present disclosure, the parameter for characterizing the different conditions or requirements is not clearly divided and limited according to condition categories, and the random access channel may be selected by combining different parameters (for characterizing one or more of the above conditions, not limited to the above conditions) according to actual needs.

In one embodiment, in a case of selecting the random access channel according to the type of the terminal or the capability of the terminal or the level of the terminal, the selecting the random access channel according to the current signal transmission condition specifically includes: determining a sending bandwidth capability of the terminal according to the type of the terminal or the capability of the terminal or the level of the terminal, and determining a subcarrier spacing and a preamble sequence length according to the sending bandwidth capability of the terminal; and selecting the random access channel format according to the subcarrier spacing and the preamble sequence length; or, determining an uplink budget of the terminal according to the type of the terminal or the capability of the terminal or the level of the terminal, and determining the repetition number of the preamble symbols according to the uplink budget of the terminal; and selecting the random access channel format according to the repetition number of the preamble symbols.

In one embodiment, in a case of selecting the random access channel according to the movement speed of the terminal, the selecting the random access channel according to the current signal transmission condition specifically includes: determining a Doppler shift range of the terminal according to the movement speed of the terminal, and determining a subcarrier spacing and a preamble sequence set according to the Doppler shift range of the terminal; and selecting the random access channel format according to the subcarrier spacing and the preamble sequence set.

In one embodiment, in a case of selecting the random access channel according to the error of the ephemeris information of the terminal, the selecting the random access channel according to the current signal transmission condition specifically includes: determining a range of uplink timing error and Doppler shift after pre-compensation according to an error range of the ephemeris information obtained by the terminal, and determining a subcarrier spacing and a guard interval length are determined according to the range of the uplink timing error and the Doppler shift after pre-compensation; and selecting the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or a signal-to-noise ratio from the network to the terminal; and the selecting the random access channel according to the current signal transmission condition specifically includes: in a case that the terminal initially accesses, determining the repetition number of the preamble symbols based on the downlink received signal power or signal-to-noise ratio from the network to the terminal, and determining and selecting the random access channel format according to the repetition number of the preamble symbols.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number*1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

It should be noted that parameter values listed in this table are merely illustrative, and cannot limit the protection scope of the embodiments of the present disclosure.

In one embodiment, the method further includes: adopting the selected random access channel for signal transmission.

Figure 3:
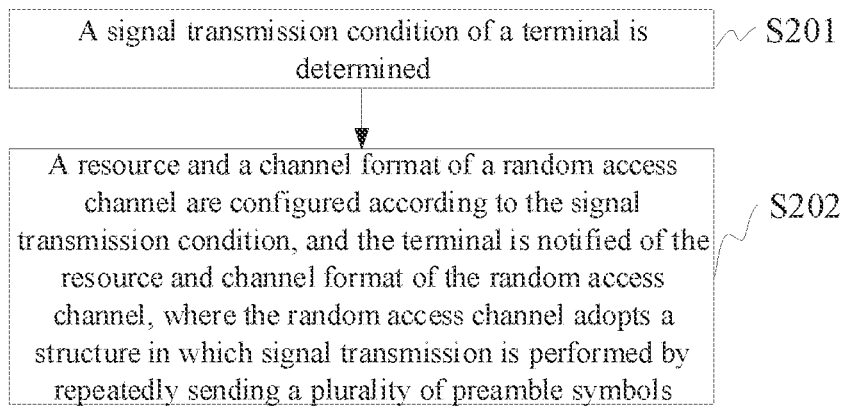
FIG. 3 is a schematic flow diagram of a channel configuration method provided by an embodiment of the present disclosure.

Correspondingly, at a network side, referring to FIG. 3, a channel configuration method provided by an embodiment of the present disclosure includes the following.

S201, a signal transmission condition of a terminal is determined.

S202, a resource and a channel format of a random access channel are configured according to the signal transmission condition, and the terminal is notified of the resource and channel format of the random access channel, where the random access channel adopts a structure in which signal transmission is performed by repeatedly sending preamble symbols.

In one embodiment, the signal transmission condition includes one or a combination of the following conditions: a type of a terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the method further includes: selling different sliding detection windows based on resources and channel formats of different random access channels, and detecting a random access signal sent by the terminal.

In one embodiment, the network side may determine a time delay range of PRACH sending based on a length of a GT, and then set a length of the sliding detection window equal to (the number of preamble symbols−1), and the number of sliding times equal to (the number of symbols of the GT+1).

Figure 4:
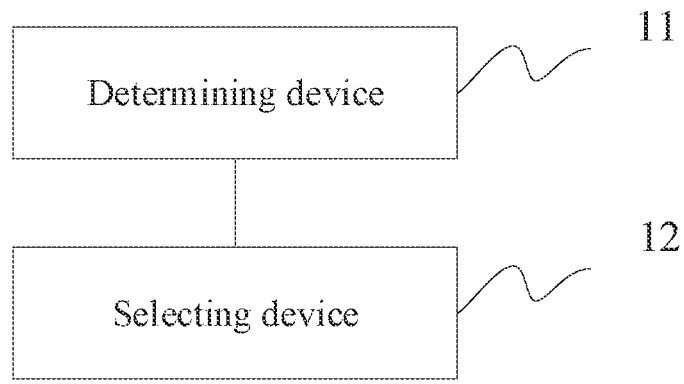
FIG. 4 is a schematic structural diagram of a channel selection apparatus provided by an embodiment of the present disclosure.

Corresponding to the above channel selection method, referring to FIG. 4, at a terminal side, a channel selection apparatus provided by an embodiment of the present disclosure, includes: a determining device 11, configured to determine a current signal transmission condition; and a selecting device 12, configured to select a random access channel according to the current signal transmission condition, where the random access channel adopts a structure in which signal transmission is performed by repeatedly sending preamble symbols.

In one embodiment, the current signal transmission condition includes one or a combination of the following conditions: a type of a terminal; a capability of the terminal; a level of the terminal; a movement speed of the terminal; or error of ephemeris information of the terminal.

In one embodiment, the selecting device 12 is specifically configured to: determine a sending bandwidth capability of the terminal according to the type of the terminal or the capability of the terminal or the level of the terminal, and determine a subcarrier spacing and a preamble sequence length according to the sending bandwidth capability of the terminal; and select the random access channel format according to the subcarrier spacing and the preamble sequence length; or, determine an uplink budget of the terminal according to the type of the terminal or the capability of the terminal or the level of the terminal, and determine the repetition number of the preamble symbols according to the uplink budget of the terminal; and select the random access channel format according to the repetition number of the preamble symbols.

In one embodiment, the selecting device 12 is specifically configured to: determine a Doppler shift range of the terminal according to the movement speed of the terminal, and determine a subcarrier spacing and a preamble sequence set according to the Doppler shift range of the terminal; and select the random access channel format according to the subcarrier spacing and the preamble sequence set.

In one embodiment, the selecting device 12 is specifically configured to: determine a range of uplink timing error and Doppler shift after pre-compensation according to an error range of the ephemeris information obtained by the terminal, and determine a subcarrier spacing and a guard interval length according to the range of the uplink timing error and the Doppler shift after pre-compensation; and select the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or a signal-to-noise ratio from the network to the terminal; the selecting device 12 is specifically configured to: in a case that the terminal initially accesses, determine the repetition number of the preamble symbols based on the downlink received signal power or signal-to-noise ratio from the network to the terminal, and determine and select the random access channel format according to the repetition number of the preamble symbols.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the selecting device 12 is further configured to: adopt the selected random access channel for signal transmission.

Figure 5:
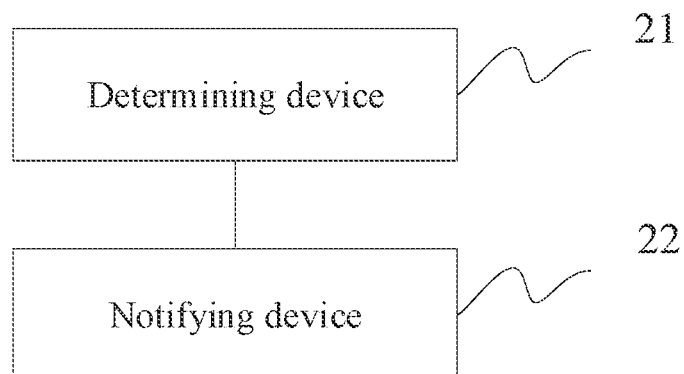
FIG. 5 is a schematic structural diagram of a channel configuration apparatus provided by an embodiment of the present disclosure.

Corresponding to the above channel configuration method, referring to FIG. 5, at a network side, a channel configuration apparatus provided by an embodiment of the present disclosure, includes: a determining device 21, configured to determine a signal transmission condition of a terminal; and a notifying device 22, configured to configure a resource and a channel format of a random access channel according to the signal transmission condition, and notify the terminal of the resource and channel format of the random access channel, where the random access channel adopts a structure in which signal transmission is performed by repeatedly sending preamble symbols.

In one embodiment, the signal transmission condition includes one or a combination of the following conditions: a type of terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the notifying device 22 is further configured to: set different sliding detection windows based on resources and channel formats of different random access channels, and detecting a random access signal sent by the terminal.

It should be noted here that the above apparatus provided by the embodiments of the present disclosure can implement all the method steps implemented by the above method embodiments, and can achieve the same effect, and the parts and beneficial effects same as the method embodiments in the present embodiments will not be described in detail here.

It should be noted that division of devices in the embodiments of the present disclosure is schematic, and is only a logical function division, and there may be other division manners in actual implementation. In addition, each functional device in each embodiment of the present disclosure may be integrated into one processing device, or each device may exist physically alone, or two or more devices may be integrated into one device. The above integrated device may be implemented in a form of hardware, or may be implemented in a form of software functional devices.

The integrated device, if implemented in the form of a software functional device and sold or used as an independent product, may be stored in a computer readable storage medium. Based on this understanding, the embodiments of the present disclosure essentially, or parts contributing to the prior art, or all or part of the embodiments can be embodied in a software product form. A computer software product is stored in a storage medium, including instructions configured to cause a computer device (may be a personal computer, a server, a network device, etc.) or a processor to execute all or part of the steps of the methods in all the embodiments of the present disclosure. The aforementioned storage medium includes: a U disk, a mobile hard disk, a read-only memory (ROM), a random access memory (RAM), a magnetic disk or an optical disk and other media that can store program codes.

Figure 6:
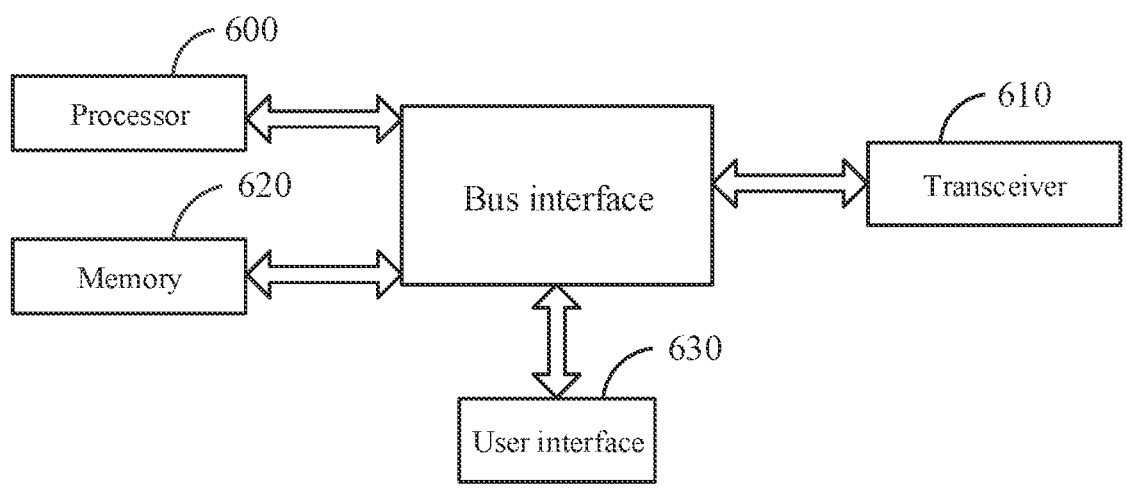
FIG. 6 is a schematic structural diagram of another channel selection apparatus provided by an embodiment of the present disclosure.

Referring to FIG. 6, at a terminal side, another channel selection apparatus provided by an embodiment of the present disclosure, includes: a memory 620 and a processor 600; where the memory 620 is configured to store a program instruction, and the processor 600 is configured to call the program instruction stored in the memory and execute according to the obtained program: determining a current signal transmission condition; selecting a resource and a channel format of a random access channel according to the current signal transmission condition and configuration of a network, where the random access channel adopts a structure in which signal transmission is performed by repeatedly sending preamble symbols.

In one embodiment, the current signal transmission condition includes one or a combination of the following conditions: a type of a terminal; a capability of the terminal; a level of the terminal; a movement speed of the terminal; or error of ephemeris information of the terminal.

In one embodiment, the processor 600 is specifically configured to: determine a sending bandwidth capability of the terminal according to the type of the terminal or the capability of the terminal or the level of the terminal, and determine a subcarrier spacing and a preamble sequence length according to the sending bandwidth capability of the terminal; and select the random access channel format according to the subcarrier spacing and the preamble sequence length; or, determine an uplink budget of the terminal according to the type of the terminal or the capability of the terminal or the level of the terminal, and determine the repetition number of the preamble symbols according to the uplink budget of the terminal; and select the random access channel format according to the repetition number of the preamble symbols.

In one embodiment, the processor 600 is specifically configured to: determine a Doppler shift range of the terminal according to the movement speed of the terminal, and determine a subcarrier spacing and a preamble sequence set according to the Doppler shift range of the terminal; and select the random access channel format according to the subcarrier spacing and the preamble sequence set.

In one embodiment, the processor 600 is specifically configured to: determine a range of uplink timing error and Doppler shift after pre-compensation according to an error range of the ephemeris information obtained by the terminal, and determine a subcarrier spacing and a guard interval length according to the range of the uplink timing error and the Doppler shift after pre-compensation; and select the random access channel format according to the subcarrier spacing and the guard interval length.

In one embodiment, the capability of the terminal includes: whether the terminal has a capability to obtain geographical location information of the terminal.

In one embodiment, the current signal transmission condition includes: downlink received signal power or signal-to-noise ratio from the network to the terminal; the processor 600 is specifically configured to: in a case that the terminal initially accesses, determine the repetition number of the preamble symbols based on the downlink received signal power or signal-to-noise ratio from the network to the terminal, and determine and select the random access channel format according to the repetition number of the preamble symbols.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the processor 600 is further configured to: adopt the selected random access channel for signal transmission.

A transceiver 610 is configured to receive and send data under control of the processor 600.

Herein, in FIG. 6, a bus architecture may include any number of interconnected buses and bridges, which are specifically linked together by various circuits of one or more processors represented by the processor 600 and a memory represented by the memory 620. The bus architecture may further link various other circuits such as a peripheral device, a voltage stabilizer and a power management circuit together, which are publicly known in the art and therefore are not further described herein. A bus interface provides an interface. The transceiver 610 may be elements, including a transmitter and a receiver, that provide a device for communicating with various other apparatus over a transmission medium. For different user equipment, a user interface 630 may further be an interface capable of being externally connected and internally connected with a required device, and the connected device includes but is not limited to a keypad, a display, a speaker, a microphone, a joystick, and the like.

The processor 600 is responsible for managing the bus architecture and usual processing, and the memory 620 may store data used by the processor 600 during operation execution.

In one embodiment, the processor 600 may be a central processing unit (CPU), an application specific integrated circuit (ASIC), a field-programmable gate array (FPGA) or a complex programmable logic device (CPLD).

Figure 7:
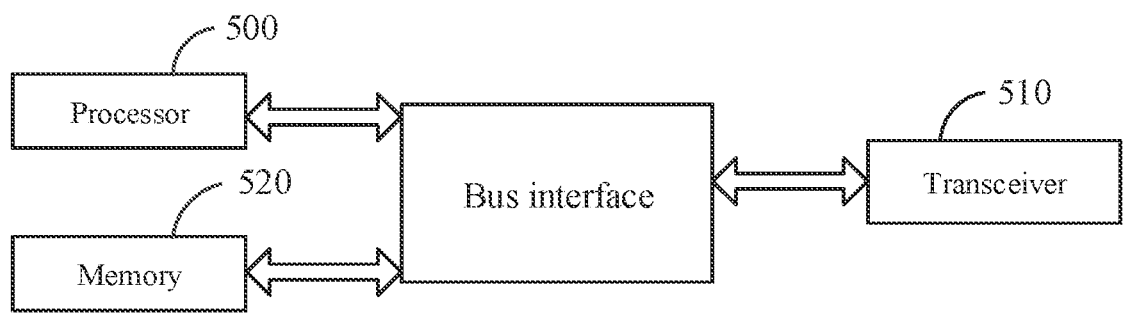
FIG. 7 is a schematic structural diagram of another channel selection apparatus provided by an embodiment of the present disclosure.

At a network side, referring to FIG. 7, another channel configuration apparatus provided by an embodiment of the present disclosure, includes: a memory 520 and a processor 500; where the memory 520 is configured to store a program instruction, and the processor 500 is configured to call the program instruction stored in the memory and execute according to the obtained program: determining a signal transmission condition of a terminal; configuring a resource and a channel format of a random access channel according to the signal transmission condition, and notifying the terminal of the resource and channel format of the random access channel, where the random access channel adopts a structure in which signal transmission is performed by repeatedly sending preamble symbols.

In one embodiment, the signal transmission condition includes one or a combination of the following conditions: a type of a terminal; a capability of the terminal; a level of the terminal; a movement speed of the terminal; or error of ephemeris information of the terminal.

In one embodiment, the capability of the terminal includes: whether the terminal has a capability to obtain geographical location information of the terminal.

In one embodiment, the signal transmission condition includes: a radius of a cell or a deployed frequency band.

In one embodiment, the format of the random access channel is selected from the random access channel formats shown in the following table:

| PRACH format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | | where PRACH is the random access channel.

In one embodiment, the resource of the random access channel corresponds to one or more different random access channel formats.

In one embodiment, the processor 500 is further configured to: set different sliding detection windows based on resources and channel formats of different random access channels, and detecting a random access signal sent by the terminal.

A transceiver 510 is configured to receive and send data under control of the processor 500.

Herein, in FIG. 7, a bus architecture may include any number of interconnected buses and bridges, which are specifically linked together by various circuits of one or more processors represented by the processor 500 and a memory represented by the memory 520. The bus architecture may further link various other circuits such as a peripheral device, a voltage stabilizer and a power management circuit together, which are publicly known in the art and therefore are not further described herein. The bus interface provides an interface. The transceiver 510 may be elements, including a transmitter and a receiver, that provide a device for communicating with various other apparatus over a transmission medium. The processor 500 is responsible for managing the bus architecture and usual processing, and the memory 520 may store data used by the processor 500 during operation execution.

The processor 500 may be a central processing unit, an application specific integrated circuit, a field programmable gate array, or a complex programmable logic device.

It should be noted here that the above apparatus provided by the embodiments of the present disclosure can implement all the method steps implemented by the above method embodiments, and can achieve the same effect, and the parts and beneficial effects same as the method embodiments in the present embodiments will not be described in detail here.

An embodiment of the present disclosure provides a computing device, and the computing device may specifically be a desktop computer, a portable computer, a smart phone, a tablet computer, a PDA, and the like. The computing device may include a central processing unit, a memory, an input/output device, etc., the input device may include a keyboard, a mouse, a touch screen, etc., and the output device may include a display device, such as a liquid crystal display (LCD), a cathode ray tube (CRT), etc.

The memory may include a ROM and a RAM and provide the processor with a program instruction and data stored in the memory. In the embodiments of the present disclosure, the memory may be configured to store a program of any method provided in the embodiments of the present disclosure.

The processor calls the program instructions stored in the memory, and the processor is configured to execute any method provided by the embodiments of the present disclosure according to the obtained program instructions.

An embodiment of the present disclosure provides a computer storage medium for storing computer program instructions used by an apparatus provided by the above embodiment of the present disclosure, including a program for executing any method provided by the above embodiment of the present disclosure.

The computer storage medium may be any available medium or data storage device that can be accessed by a computer, including but not limited to, a magnetic storage (such as a floppy disk, a hard disk, a magnetic tape, a magneto-optical disk (MO), etc.), an optical memory (for example, CD, DVD, BD, high-definition versatile disc (HVD), etc.), and a semiconductor memory (such as ROM, erasable programmable read-only memory (EPROM), electrically erasable programmable read only memory (EEPROM), non-volatile memory (NAND FLASH), a solid state disk (SSD)), etc.

The method provided by the embodiments of the present disclosure may be applied to a terminal device, and may also be applied to a network device.

The terminal device may also be referred to as the UE, a mobile station (MS), a mobile terminal, etc. In one embodiment, the terminal may have a capability to communicate with one or more core networks via a RAN, for example, the terminal may be a mobile phone (or called a "cellular"

phone), or a computer of a mobile nature, etc. For example, the terminal may further be portable, pocket-sized, hand-held, computer built-in or vehicle-mounted mobile apparatus.

The network device may be a base station (eg, an access point), and refers to a device in an access network that communicates with a wireless terminal over an air interface through one or more sectors. The base station may be configured to convert received air frames to and from IP packets, and act as a router between the wireless terminal and the rest of the access network, where the rest of the access network may include an IP network. The base station may further coordinate attribute management for the air interface. For example, the base station may be a base station in GSM or CDMA, a base station in WCDMA, an evolved base station in LTE, or a gNB in a 5G system, or the like, which is not limited in the embodiments of the present disclosure.

The processing flow of the above methods may be implemented by a software program, and the software program may be stored in a storage medium, and the stored software program, when called, executes the above method steps.

The embodiment of the present disclosure may be provided as a method, a system or a computer program product. Therefore, the present disclosure can adopt forms of full hardware embodiments, full software embodiments, or embodiments combining software and hardware aspects. One embodiment of the present disclosure can adopt a form of the computer program products implemented on one or more computer available storage mediums (including but not limited to a disk memory, an optical memory and the like) containing computer available program codes.

The present disclosure is described with reference to flow diagrams and/or block diagrams of the methods, the devices (systems), and computer program products according to the embodiments of the present disclosure. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, and the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implement the functions specified in one or more flows in the flow diagrams and/or one or more blocks in the block diagrams.

These computer program instructions may also be loaded to the computer or other programmable data processing devices, and a series of operating steps are executed on the computer or other programmable devices to generate computer-implemented processing, and the instructions executed on the computer or other programmable devices provide steps for implementing the functions specified in one or more flows in the flow diagrams and/or one or more blocks in the block diagrams.

Various modifications and variations to the present disclosure without departing from the embodiments of the present disclosure. In this way, if these modifications and variations of the present disclosure fall within the scope of the claims of the present disclosure, the present disclosure also intends to include these modifications and variations.

What is claimed is:

1. A channel selection method, comprising:
   determining a current signal transmission condition; wherein the current signal transmission condition comprises one or a combination of: a type of a terminal, a capability of the terminal, a level of the terminal, a movement speed of the terminal, or error of ephemeris information of the terminal; and
   selecting a resource and a channel format of a random access channel according to the current signal transmission condition and configuration of a network, wherein the random access channel adopts a structure in which signal transmission is performed by repeatedly sending a plurality of preamble symbols;
   wherein in a case of selecting the random access channel according to the type of the terminal or the capability of the terminal or the level of the terminal, the selecting the random access channel according to the current signal transmission condition specifically comprises:
   determining a sending bandwidth capability of the terminal according to the type of the terminal or the capability of the terminal or the level of the terminal, and determining a subcarrier spacing and a preamble sequence length according to the sending bandwidth capability of the terminal; and selecting the channel format of the random access channel according to the subcarrier spacing and the preamble sequence length; or,
   determining an uplink budget of the terminal according to the type of the terminal or the capability of the terminal or the level of the terminal, and determining a repetition number of the preamble symbols according to the uplink budget of the terminal; and selecting the channel format of the random access channel according to the repetition number of the preamble symbols.

2. The method according to claim 1, wherein in a case of selecting the random access channel according to the movement speed of the terminal, the selecting the random access channel according to the current signal transmission condition specifically comprises:
   determining a Doppler shift range of the terminal according to the movement speed of the terminal, and determining a subcarrier spacing and a preamble sequence set according to the Doppler shift range of the terminal; and
   selecting the channel format of the random access channel according to the subcarrier spacing and the preamble sequence set.

3. The method according to claim 1, wherein in a case of selecting the random access channel according to the error of the ephemeris information of the terminal, the selecting the random access channel according to the current signal transmission condition specifically comprises:
  determining a range of uplink timing error and Doppler shift after pre-compensation according to an error range of the ephemeris information obtained by the terminal, and determining a subcarrier spacing and a guard interval length according to the range of the uplink timing error and the Doppler shift after pre-compensation; and
  selecting the channel format of the random access channel according to the subcarrier spacing and the guard interval length.

4. The method according to claim 1, wherein the capability of the terminal comprises:
  a capability to obtain geographical location information of the terminal.

5. The method according to claim 1, wherein the current signal transmission condition comprises: downlink received signal power or a signal-to-noise ratio from the network to a terminal;
  wherein the selecting the random access channel according to the current signal transmission condition specifically comprises:
  in a case that the terminal initially accesses, determining a repetition number of the preamble symbols based on the downlink received signal power or the signal-to-noise ratio from the network to the terminal, and determining and selecting the channel format of the random access channel according to the repetition number of the preamble symbols.

6. The method according to claim 1, wherein the channel format of the random access channel is selected from random access channel formats shown in a following table.

7. The method according to claim 1, wherein the resource of the random access channel corresponds to one or more different random access channel formats.

8. The method according to claim 1, further comprising: adopting the selected random access channel for signal transmission.

9. A channel configuration method, comprising:
  determining a signal transmission condition of a terminal; wherein the signal transmission condition comprises one or a combination of: a type of the terminal, a capability of the terminal, a level of the terminal, a movement speed of the terminal, or error of ephemeris information of the terminal; and
  configuring a resource and a channel format of a random access channel according to the signal transmission condition, and notifying the terminal of the resource and the channel format of the random access channel to cause the terminal, in a case of selecting the random access channel according to the type of the terminal or the capability of the terminal or the level of the terminal, to determine a sending bandwidth capability of the terminal according to the type of the terminal or the capability of the terminal or the level of the terminal, and determine a subcarrier spacing and a preamble sequence length according to the sending bandwidth capability of the terminal; and select the channel format of the random access channel according to the subcarrier spacing and the preamble sequence length, or,
  determine an uplink budget of the terminal according to the type of the terminal or the capability of the terminal or the level of the terminal, and determine a repetition number of the preamble symbols according to the uplink budget of the terminal; and select the channel format of the random access channel according to the repetition number of the preamble symbols;
  wherein the random access channel adopts a structure in which signal transmission is performed by repeatedly sending a plurality of preamble symbols.

| Physical random access channel (PRACH) format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence. |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | |

10. The method according to claim 9, wherein the capability of the terminal comprises:
a capability to obtain geographical location information of the terminal.

11. The method according to claim 9, wherein the signal transmission condition comprises:
a radius of a cell or a deployed frequency band.

12. The method according to claim 9, wherein the channel format of the random access channel is selected from random access channel formats shown in a following table:

| Physical random access channel (PRACH) format serial number | Preamble sequence length | Subcarrier spacing | Preamble symbol length = repetition number * 1 orthogonal frequency division multiplexing symbol time length | Guard interval length = repetition number * 1 orthogonal frequency division multiplexing symbol time length | ZC sequence |
|---|---|---|---|---|---|
| 0 | 839 | 15 khz | [5 − 1 = 4] * 66.67 μs = 266.68 μs | 1 * 66.67 μs = 66.67 μs | Unrestricted sequence, |
| 1 | 839 | 15 khz | [15 − 2 = 13] * 66.67 μs = 866.71 μs | 2 * 66.67 μs = 133.34 μs | Type A sequence |
| 2 | 839 | 30 khz | [5 − 1 = 4] * 33.33 μs = 133.32 μs | 1 * 33.33 μs = 33.33 μs | |
| 3 | 139 | 60 khz | [15 − 6 = 9] * 16.67 μs = 150.03 μs | 6 * 16.67 μs = 100 μs | Unrestricted sequence. |
| 4 | 139 | 60 khz | [15 − 3 = 12] * 16.67 μs = 200.04 μs | 3 * 16.67 μs = 50 μs | |
| 5 | 139 | 120 khz | [30 − 12 = 18] * 8.33 μs = 150.03 μs | 12 * 8.33 μs = 100 μs | |

13. The method according to claim 9, wherein the resource of the random access channel corresponds to one or more different random access channel formats.

14. The method according to claim 9, further comprising:
setting different sliding detection windows based on resources and channel formats of different random access channels, and
detecting a random access signal sent by the terminal.

15. A channel configuration apparatus, comprising:
a memory, configured to store a program instruction; and
a processor, configured to call the program instruction stored in the memory and execute the method according to claim 9 according to an obtained program.

16. A channel selection apparatus, comprising:
a memory, configured to store a program instruction; and
a processor, configured to call the program instruction stored in the memory and execute according to an obtained program:
determining a current signal transmission condition; wherein the current signal transmission condition comprises one or a combination of: a type of a terminal, a capability of the terminal, a level of the terminal, a movement speed of the terminal, or error of ephemeris information of the terminal; and
selecting a resource and a channel format of a random access channel according to the current signal transmission condition and configuration of a network, wherein the random access channel adopts a structure in which signal transmission is performed by repeatedly sending a plurality of preamble symbols;
wherein in a case of selecting the random access channel according to the type of the terminal or the capability of the terminal or the level of the terminal, the selecting the random access channel according to the current signal transmission condition specifically comprises:
determining a sending bandwidth capability of the terminal according to the type of the terminal or the capability of the terminal or the level of the terminal, and determining a subcarrier spacing and a preamble sequence length according to the sending bandwidth capability of the terminal; and selecting the channel format of the random access channel according to the subcarrier spacing and the preamble sequence length; or,
determining an uplink budget of the terminal according to the type of the terminal or the capability of the terminal or the level of the terminal, and determining a repetition number of the preamble symbols according to the uplink budget of the terminal; and selecting the channel format of the random access channel according to the repetition number of the preamble symbols.

17. The apparatus according to claim 16, wherein in a case of selecting the random access channel according to the movement speed of the terminal, the selecting the random access channel according to the current signal transmission condition specifically comprises:
determining a Doppler shift range of the terminal according to the movement speed of the terminal, and determining a subcarrier spacing and a preamble sequence set according to the Doppler shift range of the terminal; and
selecting the channel format of the random access channel according to the subcarrier spacing and the preamble sequence set.

18. The apparatus according to claim 16, wherein in a case of selecting the random access channel according to the error of the ephemeris information of the terminal, the selecting the random access channel according to the current signal transmission condition specifically comprises:
determining a range of uplink timing error and Doppler shift after pre-compensation according to an error range of the ephemeris information obtained by the terminal, and determining a subcarrier spacing and a guard interval length according to the range of the uplink timing error and the Doppler shift after pre-compensation; and selecting the channel format of the random access channel according to the subcarrier spacing and the guard interval length.

19. The apparatus according to claim 16, wherein the capability of the terminal comprises:

whether the terminal has a capability to obtain geographical location information of the terminal.

20. The apparatus according to claim 16, wherein the current signal transmission condition comprises: downlink received signal power or a signal-to-noise ratio from the network to a terminal;

wherein the selecting the random access channel according to the current signal transmission condition specifically comprises:

in a case that the terminal initially accesses, determining a repetition number of the preamble symbols based on the downlink received signal power or the signal-to-noise ratio from the network to the terminal, and determining and selecting the channel format of the random access channel according to the repetition number of the preamble symbols.

* * * * *